United States Patent
Warner et al.

(10) Patent No.: US 11,040,834 B2
(45) Date of Patent: Jun. 22, 2021

(54) SKIRT SYSTEM FOR A CONVEYOR

(71) Applicant: CPC ENGINEERING PTY LTD, West Perth (AU)

(72) Inventors: Graham Trevor Warner, Wellard (AU); Ronald Thomas Bell, Orange (AU); Brad Michael John Lloyd, Ellenbrook (AU)

(73) Assignee: CPC ENGINEERING PTY LTD, West Perth (AU)

( * ) Notice: Subject to any disclaimer, the term of this patent is extended or adjusted under 35 U.S.C. 154(b) by 0 days.

(21) Appl. No.: 16/643,068

(22) PCT Filed: Aug. 28, 2018

(86) PCT No.: PCT/AU2018/050919
§ 371 (c)(1),
(2) Date: Feb. 28, 2020

(87) PCT Pub. No.: WO2019/040982
PCT Pub. Date: Mar. 7, 2019

(65) Prior Publication Data
US 2020/0331703 A1 Oct. 22, 2020

(30) Foreign Application Priority Data
Aug. 28, 2017 (AU) .............................. 2017903474

(51) Int. Cl.
*B65G 21/04* (2006.01)
*B65G 15/06* (2006.01)
*B65G 21/20* (2006.01)

(52) U.S. Cl.
CPC ...... *B65G 21/2081* (2013.01); *B65G 2201/04* (2013.01); *B65G 2207/48* (2013.01)

(58) Field of Classification Search
None
See application file for complete search history.

(56) References Cited

U.S. PATENT DOCUMENTS 4,641,745 A 2/1987 Skates
5,154,280 A * 10/1992 Mott .................. B65G 21/2081
198/525

(Continued)

FOREIGN PATENT DOCUMENTS

EP 0536847 A1 4/1993
WO WO-2014197933 A1 12/2014

OTHER PUBLICATIONS

International Search Report and Written Opinion of the International Searching Authority issued in PCT/AU2018/050919, dated Oct. 12, 2018; ISA/AU.

*Primary Examiner* — Kavel Singh
(74) *Attorney, Agent, or Firm* — Harness, Dickey & Pierce, P.L.C.

(57) ABSTRACT

In accordance with the present invention, there is provided a conveyor skirt system, the system comprising: a support member; a series of skirting panels releasably fixed to the support member; a rail assembly positioned outside the conveyor, extending in a direction substantially parallel to the direction of the conveyor; and a trolley assembly mounted on the rail assembly, the trolley assembly being adapted to engage and support one or more of the skirting panels.

16 Claims, 6 Drawing Sheets

(56) References Cited

U.S. PATENT DOCUMENTS

| | | | | |
|---|---|---|---|---|
| 6,763,935 B2 * | 7/2004 | Ostman | ............. | B65G 21/2081 |
| | | | | 198/836.1 |
| 7,299,917 B2 * | 11/2007 | Kotaki | .................. | B65G 15/08 |
| | | | | 198/811 |
| 7,571,802 B2 * | 8/2009 | Bowman | ............ | B65G 21/2081 |
| | | | | 198/836.1 |
| 8,006,830 B2 * | 8/2011 | Swinderman | ...... | B65G 21/2081 |
| | | | | 198/836.1 |
| 8,800,756 B2 * | 8/2014 | Pircon | .................. | B65G 11/166 |
| | | | | 198/836.1 |
| 2004/0031666 A1 | 2/2004 | Ostman | | |
| 2014/0054140 A1 | 2/2014 | Pircon et al. | | |

\* cited by examiner

SKIRT SYSTEM FOR A CONVEYOR

CROSS REFERENCE TO RELATED APPLICATIONS

This application is a U.S. National Phase Application under 35 U.S.C. 371 of International Application No. PCT/AU2018/050919 filed on Aug. 28, 2018, which claims the benefit of priority from Australian Patent Application No. 2017903474 filed on Aug. 28, 2017. The entire disclosures of all of the above applications are incorporated herein by reference.

TECHNICAL FIELD

The present invention relates to a skirt system for a conveyor. More preferably, the skirt system of the present invention is intended to allow for the adjustment of a wear liner from the exterior of the conveyor.

BACKGROUND ART

The following discussion of the background art is intended to facilitate an understanding of the present invention only. The discussion is not an acknowledgement or admission that any of the material referred to is or was part of the common general knowledge as at the priority date of the application.

In order to transfer bulk materials a conveyor system is often used. Such conveyor systems comprise a belt that extends in a continuous loop around rollers and pulleys. The upper portion of the loop can be referred to as a transfer area and the lower portion of the loop can be referred to as a return run. Bulk material is loaded onto the transfer area and is carried along by the conveyor system.

As the bulk material is typically particulate in nature, it is also common to heap the bulk material near the centerline of the belt, while keeping such bulk material from spilling off of the edges of the belt. To prevent such spillage, most conveyor systems comprise rigid skirts that are provided along each edge of the transfer area for purposes of redirecting stray bulk material and maintaining such material on the belt.

Because many types of bulk materials are abrasive, it is also common practice to attach wear liners to the skirts, which prevent the skirts from direct contact with the bulk material. Over time, the wear liners degrade from direct contact with the moving bulk material and periodically must be replaced.

In addition to replacement, it is also often desirable to be able to adjust the position the wear liners relative to the skirt and belt. By doing so, a desired gap between the wear liners and the belt can be established and periodically controlled. The positioning of the wear liner is critical to controlling spillage and incorrect or inadequate mounting can cause severe damage to the belt.

Due to the fact that wear liners are mounted to the side of the skirt facing the center plane of the belt (the inward side), adjustment of the skirts is carried out by two work crews, one inside the chute/transfer area physically manipulating the positon of the liners and the other crew outside chute/transfer area manipulating the means that fastens the wear liners.

The requirement of a crew working inside the chute/transfer area present a safety risk to the operators. In order to address this problem various mechanisms have been proposed that seek to permit the height of the liner to be adjusted from outside the chute/transfer area. One such mechanism comprises a washer on each skirt liner bolt that is attached to a threaded rod to move the liner up or down. Mechanisms such as these work well initially, however most areas of skirting are subject to dirty conditions and after a short period of use the complex adjustment mechanism is fouled and seizes.

Throughout this specification, unless the context requires otherwise, the word "comprise" or variations such as "comprises" or "comprising", will be understood to imply the inclusion of a stated integer or group of integers but not the exclusion of any other integer or group of integers

SUMMARY OF INVENTION

In accordance with the present invention, there is provided a skirt system for a conveyor, the skirt system comprising:
a skirt panel, having an external face and a working face, the skirt panel being provided with one or more openings;
a wear liner, having a mounting face and a wear face, mounted on the working face of the skirt panel, the mounting face having one or more adjustment members extending outwardly therefrom, each adjustment member being adapted to pass through an opening; and
one or more height adjustment mechanisms mountable on the external face of the skirt panel, each height adjustment mechanism being adapted to engage with one or more adjustment members,
whereby the actuation of the height adjustment mechanism manipulates the position of the wear liner relative to the skirt panel.

Advantageously, as the height adjustment mechanism is mounted on the external face of the skirt panel, the present invention allows for the manipulation of the position of the wear liner from outside of the conveyor. As such, the skirt system does not require any manipulation from the interior of the conveyor belt.

Preferably, each height adjustment mechanism is adapted to engage with a single adjustment member.

In a preferred form of the present invention, each slot is adapted to receive a single adjustment member.

Preferably, each opening is a slot extending in the vertical plane. More preferably, the width of the opening is sized to limit the movement of the adjustment members in the horizontal plane. By providing the openings as slots, the adjustment members may move vertically with respect to the skirt panel. This arrangement therefore permits the wear liner to move vertically relative with respect to the skirt panel. As the slot limits the horizontal movement of the adjustment member in the slot, the horizontal movement of the wear liner on the skirt panel.

In one form of the present invention, the adjustment mechanism comprises a washer. Preferably, the washer comprises an aperture adapted to receive an adjustment member therethrough. More preferably, the location of the aperture is offset from the centre of the washer. As would be appreciated by a person skilled in the art, the term offset from the centre will be understood to mean that there is larger portion of the washer on one side of the aperture. As would be understood by a person skilled in the art, by having an aperture offset from the washers centre, the point of rotation of the washer is non-central.

Preferably, the washer is adapted to engage with the skirt panel such that rotational movement of the washer manipulates the position of the adjustment member and wear liner relative to the skirt panel. More preferably, an outer edge of the washer engages with the skirt panel. The inventors have found that by providing the aperture in an offset position, the rotation of the washer will change the distance between the aperture and the outer edge of the washer. This will in turn change the distance between the adjustment member and the skirt panel, thereby adjusting the height of the wear liner relative to the skirt panel.

Preferably, the external face of the skirt panel comprises an engaging portion. Preferably, the engaging portion is adapted to engage with the outer edge of the washer. It is envisaged that the engaging portion can be any formation protruding from the external face of the skirting panel that will provide a surface for the washer to abut once it has been engaged with the adjustment member. In one form of the present invention, the engaging portion is an engagement strip. More preferably, the engagement strip spans the length of the skirt panel. It is envisaged that when multiple adjustment mechanisms are utilised they can each engage a single engagement strip.

In one form of the present invention, the outer circumference of the washer is generally circular. Alternatively, the outer surface of the washer is generally elliptical.

In one form of the present invention, the outer circumference of the washer is provided with one or more flat sections. As the engaging portion is a generally flat surface, the inventors have found that the provision of flat sections around the outer circumference of the washer provides clear points where the washer can engage the engaging portion. It is understood that the engagement of two flat sections will reduce any slippage of the washer relative to the engaging portion.

Preferably, the outer circumference of the washer has two or more flat sections. Still preferably, the outer circumference of the washer has three or more flat sections. Still preferably, the outer circumference of the washer has four or more flat sections. Still preferably, the outer circumference of the washer has five or more flat sections. Still preferably, the outer circumference of the washer has six or more flat sections. Still preferably, the outer circumference of the washer has seven or more flat sections. Still preferably, the outer circumference of the washer has eight or more flat sections. Still preferably, the outer circumference of the washer has nine or more flat sections. As would be appreciated by a person skilled in the art, the more flat sections provided around the outer circumference of the washer, the finer the height adjustments may be.

In a preferred form of the present invention, curved sections are provided between the flat sections of the washer. It is envisaged that the curved sections allow for easier transition between the flat sections.

Preferably, the adjustment mechanism is secured to the adjustment member. More preferably, at least a portion of the adjustment member is threaded to permit the securing of the adjustment mechanism to the adjustment member by a nut.

In one form of the present invention, the adjustment members are bolts extending from the mounting face of the wear liner. Preferably, the bolt pass through apertures provided in the wear liner. More preferably, the securing of the adjustment mechanism to the bolts, fastens the wear plate to the skirt panel.

In one form of the present invention, the washer further comprise a rotation means. Preferably, the rotations means can be physically manipulated to rotate the washer. In one form of the present invention, the rotation means comprises a removable tool adapted to engage with the washer.

In accordance with a further aspect of the present invention, there is provided a method for using the skirt system for a conveyor described above to adjust the height of a wear liner on a skirting panel.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
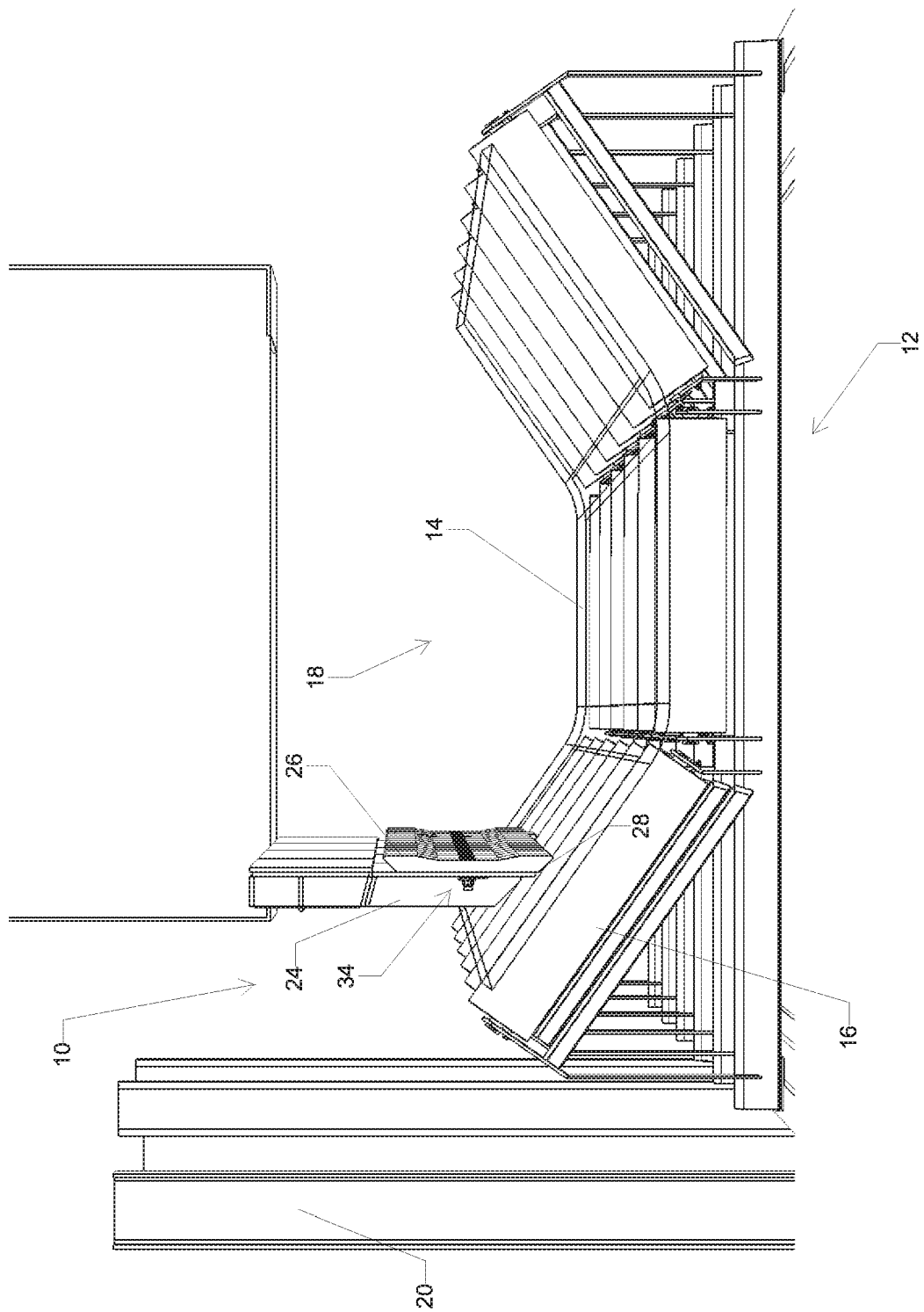
FIG. 1 is a front on view of the skirt system of the present invention.

In FIGS. 1-6, there is shown a skirt system 10 in accordance with the present invention. The skirt system 10 is adapted to be used in associated with a conventional conveyor 12. As shown in FIG. 1, conveyors 12 typically comprise a belt 14 that extends in a continuous loop around rollers (not shown). As shown, the side edges of the belt 14 are canted upwardly by side support idler rollers 16, which are inclined as shown. The upper portion of the loop can be referred to as a transfer area 18. Bulk material (not shown) is loaded onto the transfer area 18 and is carried along the conveyor 12 by the belt 14. The conveyor 12 is typically supported on a framework 20.

As the bulk material is typically particulate in nature, it is necessary to ensure that the bulk material does not spill off the edge of the belt 14. To prevent such spillage, the skirt system 10 is positioned on the sides of the transfer area 18. The skirt system 10 acts to prevent or at least inhibit the migration of the bulk material outwardly from the transfer area 18.

The skirt system 10 comprises a series of skirt panels 24. Each skirt panel 24 has a working face directed towards the transfer area 18. Similarly, each skirt panel 24 has an exterior face. A wear liner 26 is fixed to the front face of each skirt panel 24. As shown in FIG. 1, the skirt panels 24 are positioned such that a bottom edge 28 of each skirt panels 24 is just above the belt 14.

Each wear liner is provided with a series of adjustment members, for example bolts 30, extending outwardly therefrom. It is envisaged that the wear liner 26 could be provided with mounting apertures (not shown) that allow the bolts 30 to pass from the wear face. Alternatively, studs (not shown) could be welded to the mounting face of the wear liner 26.

Figure 2:
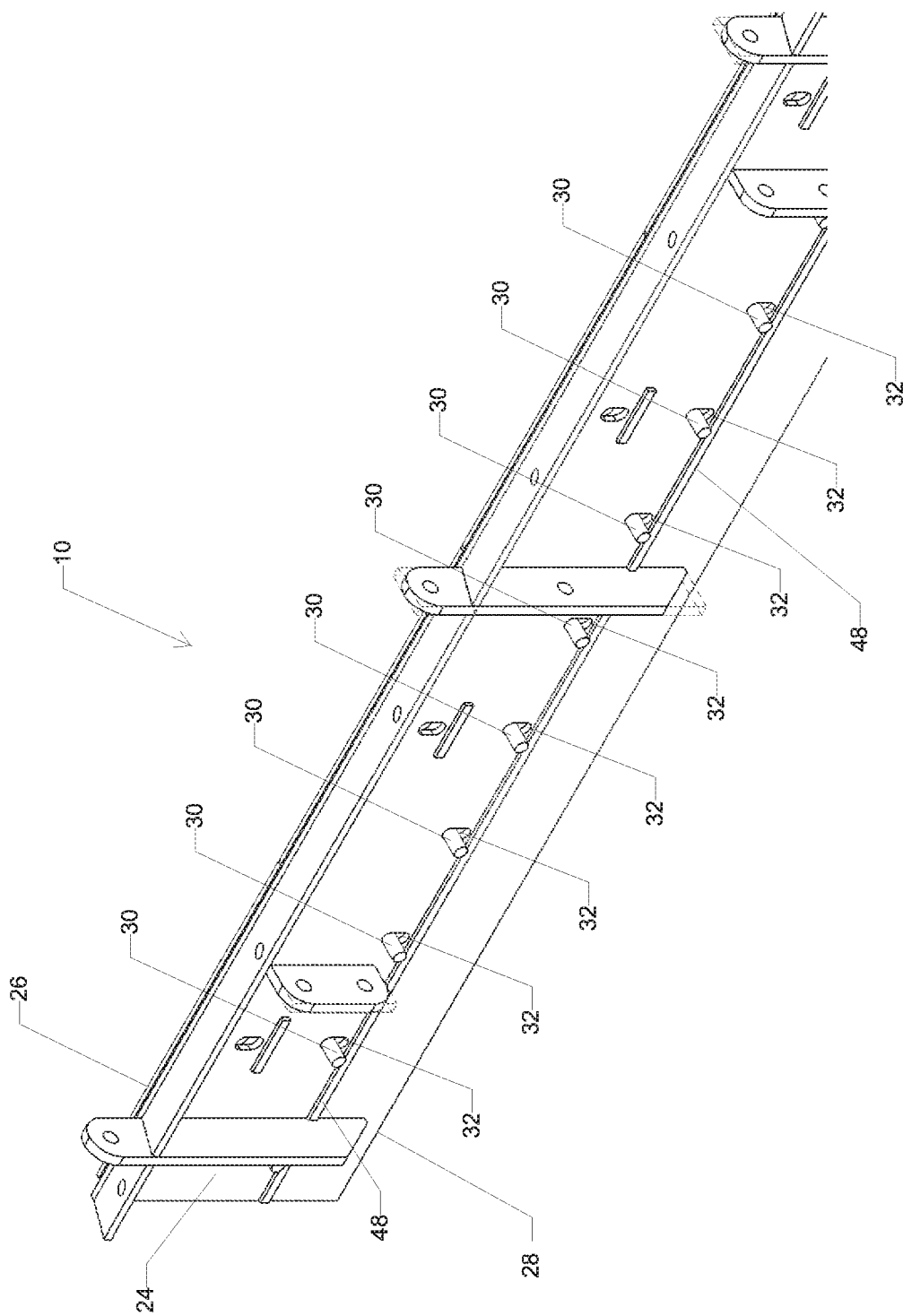
FIG. 2 is an upper perspective view of the skirt system of the present invention without the adjustment mechanisms not shown.

As best seen in FIG. 2, each skirt panel 24 is provided with a series of openings 32 adapted to receive the adjustment members. As shown in the Figures the openings 32 have a generally rectangular shape with rounded corners. The elongate axis of the openings 32 extends in a vertical direction to facilitate the vertical movement of the adjustment members within the openings 32. The width of the opening 32 is sized to minimize the horizontal movement of the adjustment members.

Figure 3:
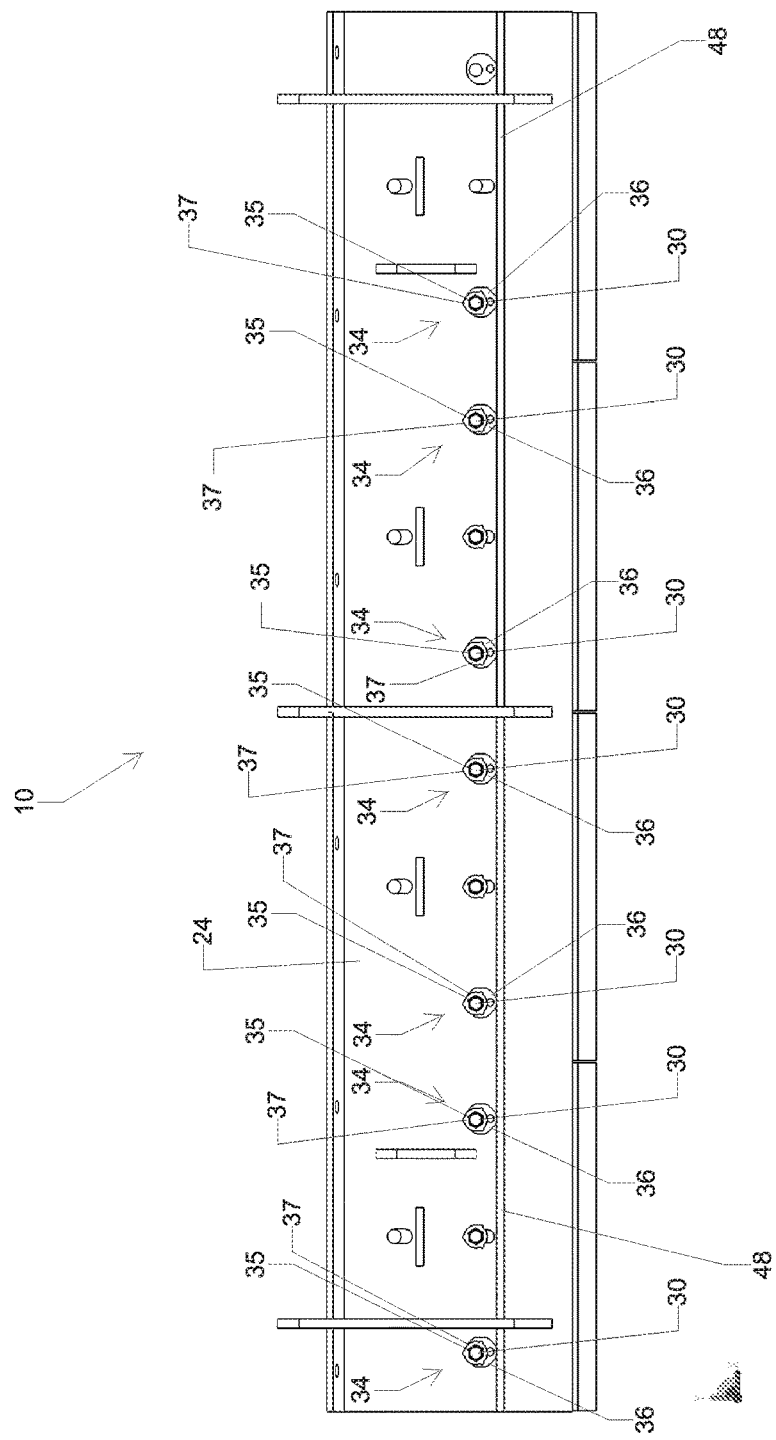
FIG. 3 is a side on view of skirt system of the present invention.
Figure 4:
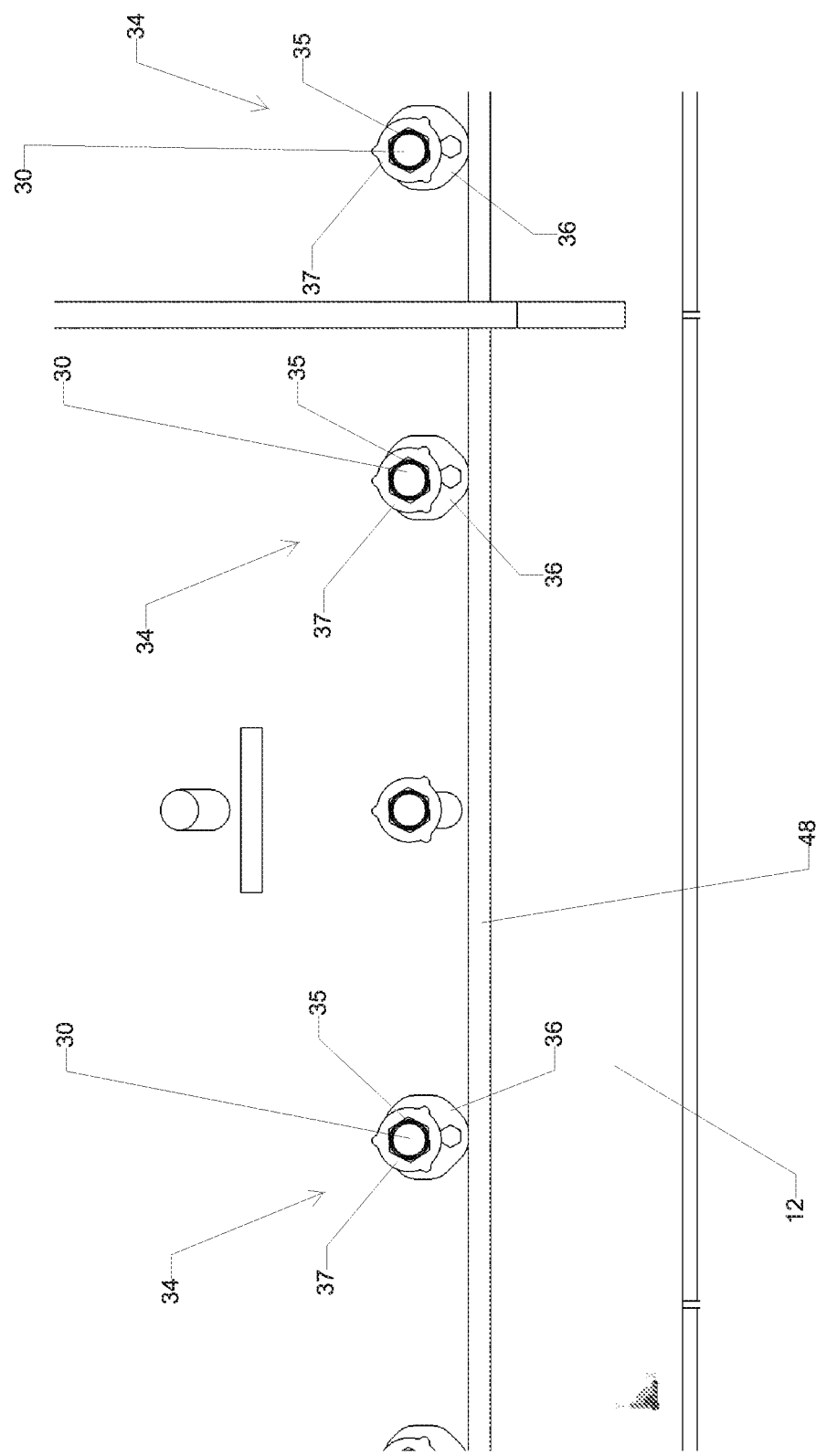
FIG. 4 is a magnified view of FIG. 3.

The adjustment members of the wear liner 26 are inserted through the openings 32 of the skirt panel 24. As shown in FIGS. 1, 3 and 4, an adjustment mechanism 34 is placed over one or more adjustment members that extend through the opening 32. As discussed above, adjustment members shown in the Figures are bolts 30, allowing a nut 35 and washer 37 to cooperate with the end of the bolts 30 to secure the adjustment mechanism 34 in place. Advantageously, the use of bolts 30 allows the adjustment members to also act to secure the wear liner 26 to the skirt panel 24. Whilst bolts are depicted in the embodiments shown, it is envisaged that the adjustment members do not need to be threaded and that the wear liner could be secured to the skirt panel 24 by separate fastening means. Suitable fastening means include locking pins, but any locking mechanism known to those skilled in the art may be used.

Figure 5:
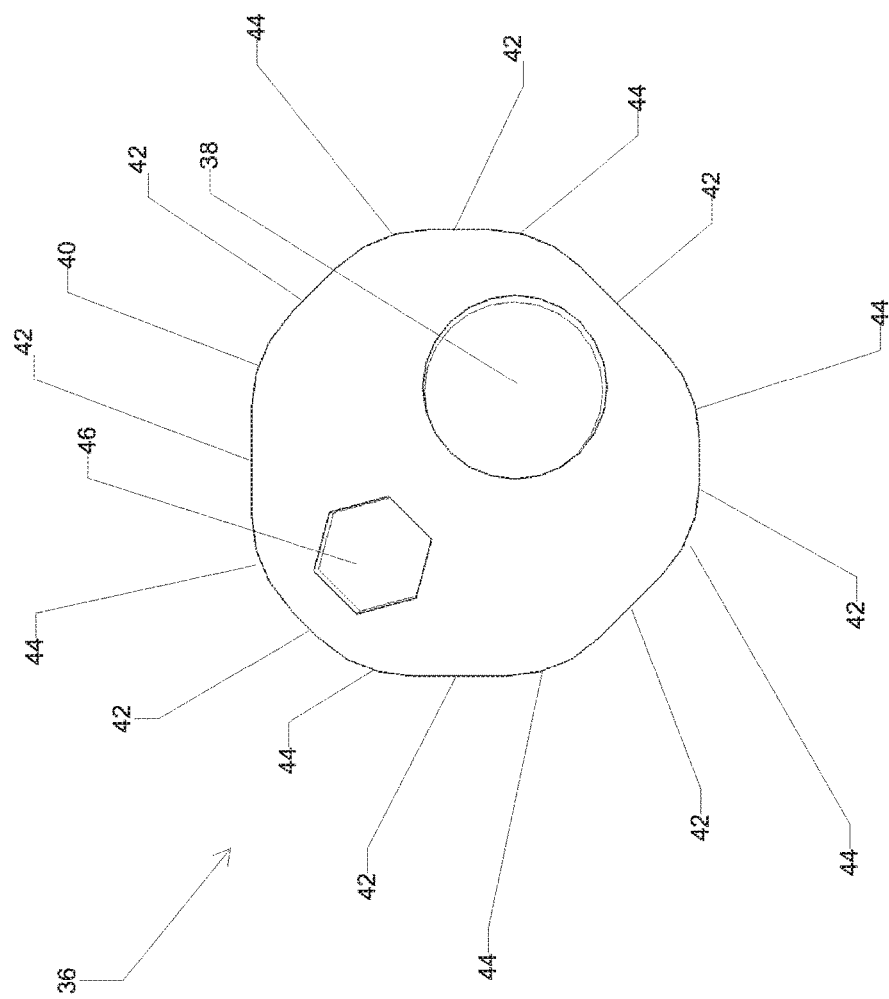
FIG. 5 is front on view of a washer used in the adjustment mechanism of the present invention.
Figure 6:
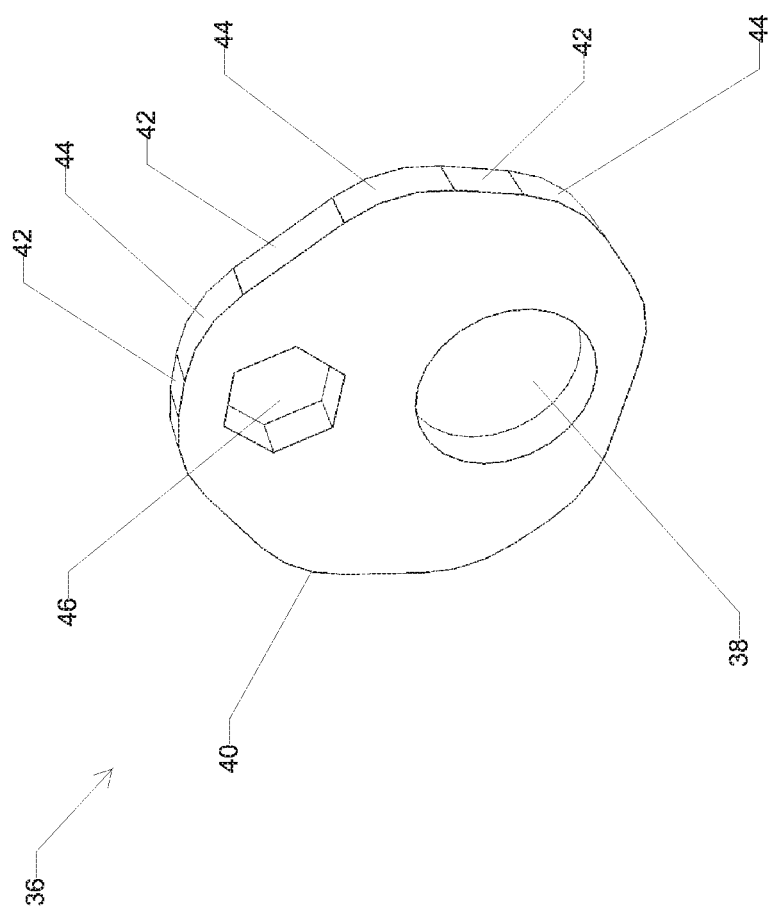
FIG. 6 is an upper perspective view of the washer of FIG. 5.

As best seen in FIGS. 5 and 6, the adjustment mechanisms 34 comprise a washer 36 having an aperture 38. The aperture 38 is adapted to receive the adjustment member therethrough. The diameter of the aperture 38 is therefore dependent on the particular adjustment member used. The aperture 38 in the washer 36 is off-center, having a larger portion on one side of the aperture 38 and a smaller portion on the other side of the aperture 38. As would be understood by a person skilled in the art, this provides the washer 36 with an non-central point of rotation about the aperture 38.

In the embodiment shown in the Figures, the outer circumference of the washer 36 is generally circular with an outer edge 40 comprising eight flat sections 42 separated by rounded sections 44.

The washer 36 further comprises a rotation means, for example a hexagonal aperture 46 adapted to receive a hex key. In the embodiment shown in FIGS. 5 and 6, once a hex key is inserted into the hexagonal aperture, a user may use the hex key to rotate the washer 36. Whilst the embodiment shown in the Figures illustrates an aperture for a hex key, it is envisaged that other rotation means can be used. Such means include an outward facing member that is adapted for cooperation with a wrench.

Referring to FIGS. 3 and 4, the outer edge 40 of the washer 36 is adapted to engage with an engaging portion 48 provided on the external face of the skirt panel 24. Advantageously, the use of an engaging portion 48 on the external face of the skirt panel 24 allows for standard skirt panel 24 to be retroactively modified for use in the skirting system 10 of the present invention.

In the embodiment shown in the Figures, the engaging portion 48 is provided in the form of an engagement strip that runs the length of the exterior face of the skirt panel 24. As shown in FIGS. 2 and 3, multiple adjustment mechanisms 34 engage with a single engaging portion 48. Advantageously, this simplifies the production of the skirt panel 24. Whilst a single engaging portion 38 is shown in the Figures, it is envisaged that multiple engaging portions 38 may be provided on the external face.

As the adjustment members are engaged to the aperture 38 of the washer 36 and the skirt panel 24 is engaged to the outer edge 40 of the washer 36, the vertical position of the wear liner 26 relative to the skirt panel 24 is dependent on the distance between the aperture 38 and the outer edge 40. As discussed above, the aperture 38 is offset from the center of the washer 36. Accordingly, rotation of the washer 36 about this point alters the distance between the aperture 38 and the point at which the washer 36 engages the skirt panel 24 which, in turn, changes the position of the wear liner 26. In this manner, the position of the wear liner 26 can be manipulated.

As discussed above, the outer edge 40 of the washer 36 is provided with eight flat sections 42. Whilst a fully circular outer edge 40 would still permit the adjustment of the height, the inventors have found that the engagement of the engaging portion 48 and the outer edge 40 is improved when flat sections 42 are provided in the outer edge 40. The engagement of two flat surfaces has been found to reduce the slippage of the washer 36 relative to the engaging portion 48. In the embodiment shown in the Figures, the eight flat sections 42 provides eight separate points of engagement that the washer may be rotated between. Each point of engagement is a different distance from the apertures 38, thereby providing a different position of the wear liner 26 on the skirt panel 24. The curved sections 44 between the flat sections 42 provide an easier transition to the next flat section 44 during rotation. Whilst the embodiment shown in the Figures has eight flat sections 42, it is envisaged that at least two flat sections 42 may be used. As would be understood by the person skilled in the art, each additional flat section 42 provided on the outer edge, increases the number of positions of the wear liner 28 on the skirt panel 24. This provides the operator with more control over the height as smaller adjustments can be made.

In use, an operator (not shown) may manipulate the position of the wear liner 28 on the skirt panel 24 by first loosening each of the nuts 35, rotating the washers 36 and tightening the nuts 35. The washers 36 are rotated by inserting a hex key into the hexagonal aperture 46 and then exerting force onto the hex key to rotate the washer 36 to the next engagement position. Advantageously, as the height adjustment mechanism 34 is mounted on the external face of the skirt panel 24, the present invention allows for the manipulation of the position of the wear liner 26 from outside of the conveyor 12. As such, the skirt system does not require any manipulation from the interior of the transfer area 18.

The inventors have found that the simplicity of the height adjustment mechanism of the present invention means that it is not as susceptible to seizing after prolonged use in dusty environments as mechanisms that rely on more complex arrangements. Furthermore, standard skirt panels may be easily retrofitted to permit their use with the skirt system of the present invention.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A skirt system for a conveyor, the skirt system comprising:
   a skirt panel, having an external face and a working face, the skirt panel being provided with one or more openings and wherein the external face of the skirt panel comprises an engaging portion;
   a wear liner, having a mounting face and a wear face, mounted on the working face of the skirt panel, the mounting face of the wear liner having one or more adjustment members extending outwardly therefrom, each adjustment member being adapted to pass through one of the one or more openings provided in the skirt panel; and one or more height adjustment mechanisms mountable on the external face of the skirt panel, each height adjustment mechanism being adapted to engage with one or more adjustment members, wherein each height adjustment mechanism comprises a washer provided with an aperture adapted to receive an adjustment member therethrough, wherein the washer is adapted to engage with the engaging portion such that rotational actuation of the washer manipulates the position of the wear liner relative to the skirt panel.

2. The skirt system according to claim 1, wherein each height adjustment mechanism is adapted to engage with a single adjustment member.

3. The skirt system according to claim 1, wherein each slot is adapted to receive a single adjustment member.

4. The skirt system according to claim 1, wherein each opening is a slot extending in the vertical plane.

5. The skirt system according to claim 1, wherein a width of the opening is sized to limit the movement of the adjustment members in the horizontal plane.

6. The skirt system according to claim 1, wherein the location of the aperture is offset from the centre of the washer.

7. The skirt system according to claim 1, wherein the washer is adapted to engage with the skirt panel such that rotational movement of the washer manipulates the position of the adjustment member and wear liner relative to the skirt panel.

8. The skirt system according to claim 1, wherein an outer edge of the washer engages with the skirt panel.

9. A skirt system according to claim 1, wherein the engaging portion is adapted to engage with the outer edge of the washer.

10. The skirt system according to claim 1, wherein the engaging portion is an engagement strip.

11. The skirt system according to claim 10, wherein the engagement strip spans a length of the skirt panel.

12. The skirt system according to claim 1, wherein an outer circumference of the washer is provided with one or more flat sections.

13. The skirt system according to claim 12, wherein the outer circumference of the washer is provided with a curved surface between the flat sections of the washer.

14. The skirt system according to claim 1, wherein the adjustment mechanism is secured to the adjustment member.

15. The skirt system according to claim 1, wherein the adjustment members are bolts extending from the mounting face of the wear liner.

16. The skirt system according to claim 15, wherein the securing of the adjustment mechanism to the bolts, fastens the wear plate to the skirt panel.

* * * * *